Aug. 29, 1933.     K. KANAI     1,924,363
FRONT WHEEL DRIVE MOTORCYCLE
Filed March 12, 1932     3 Sheets-Sheet 1
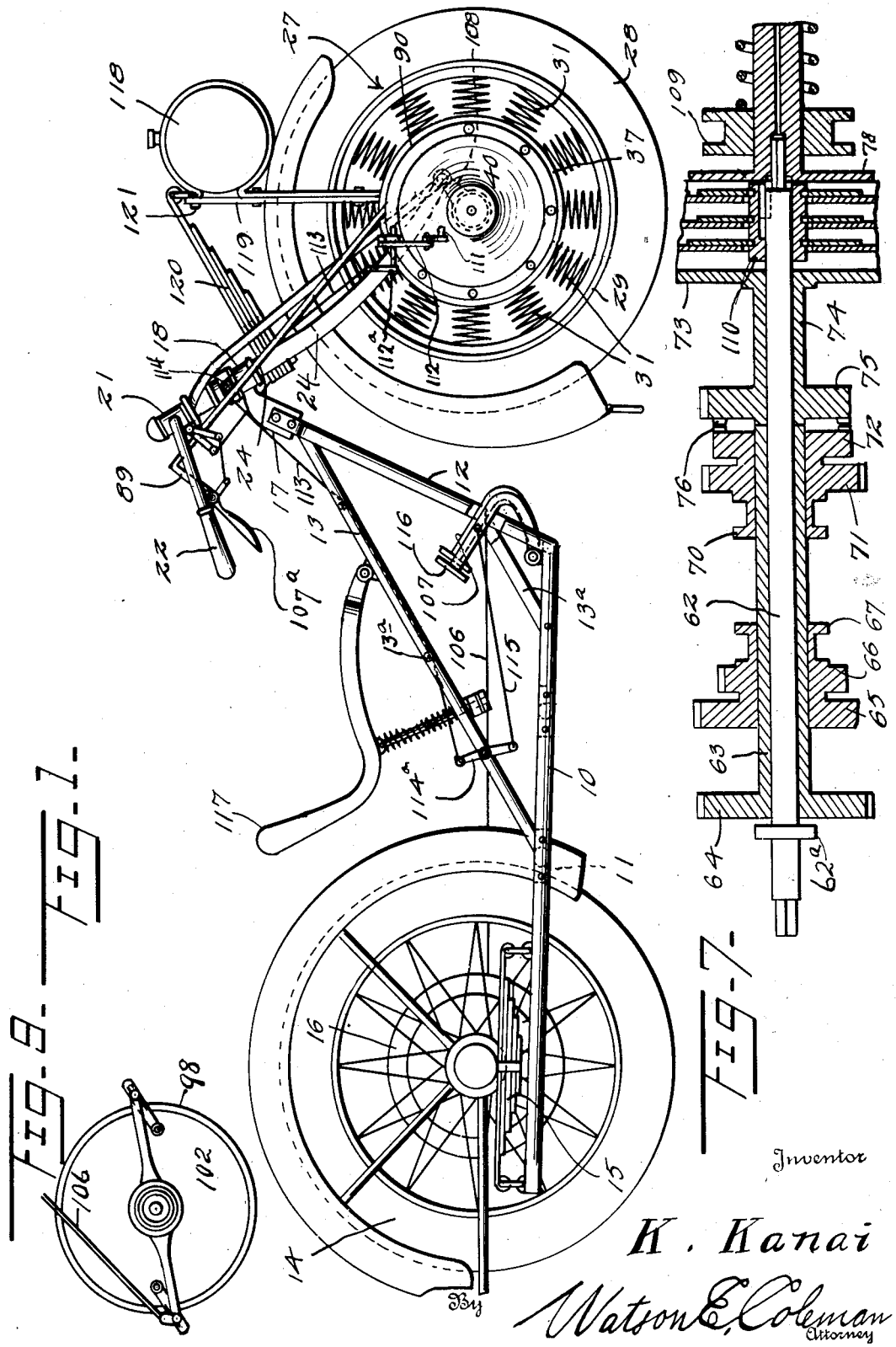
Inventor
K. Kanai
Watson E. Coleman
Attorney

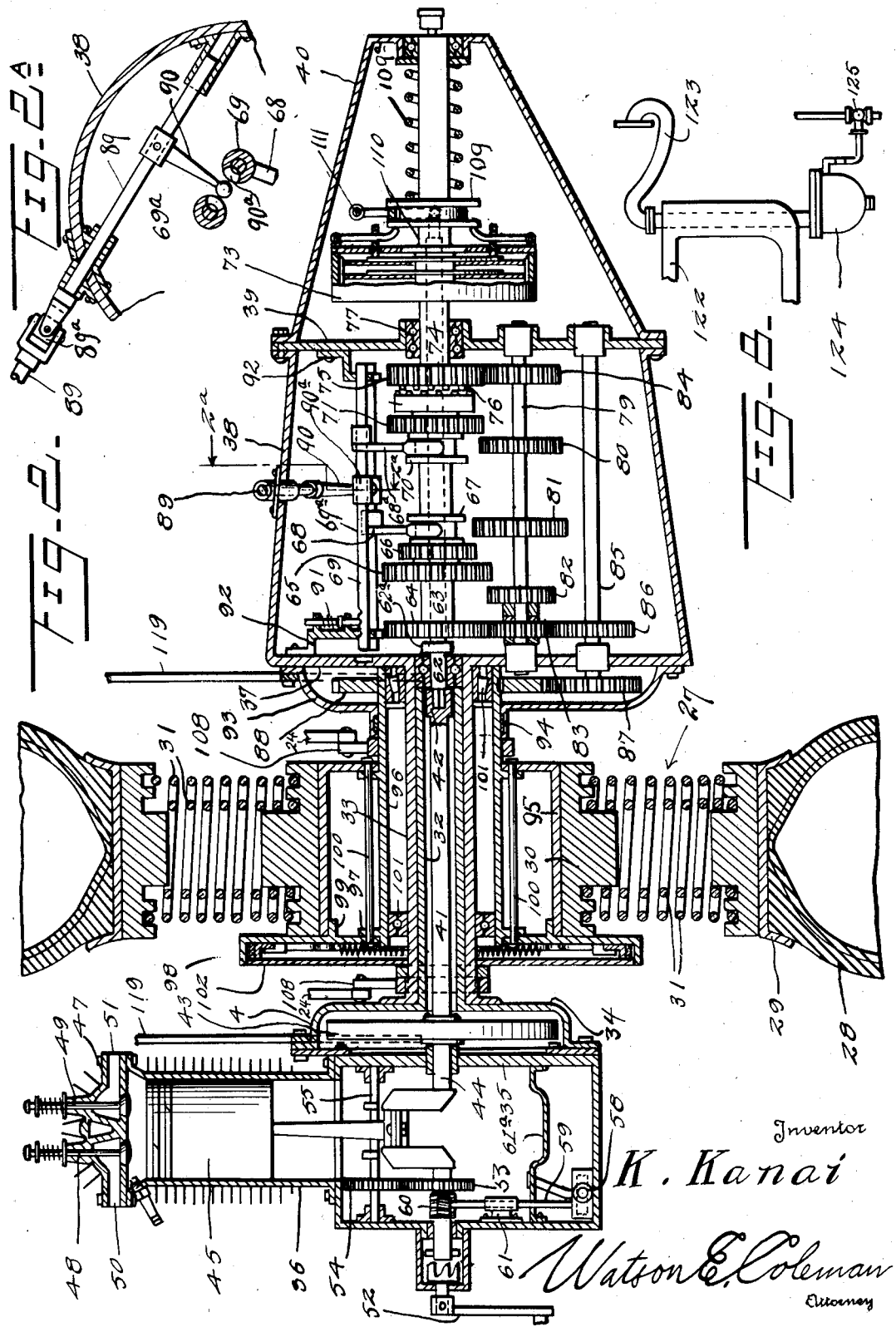

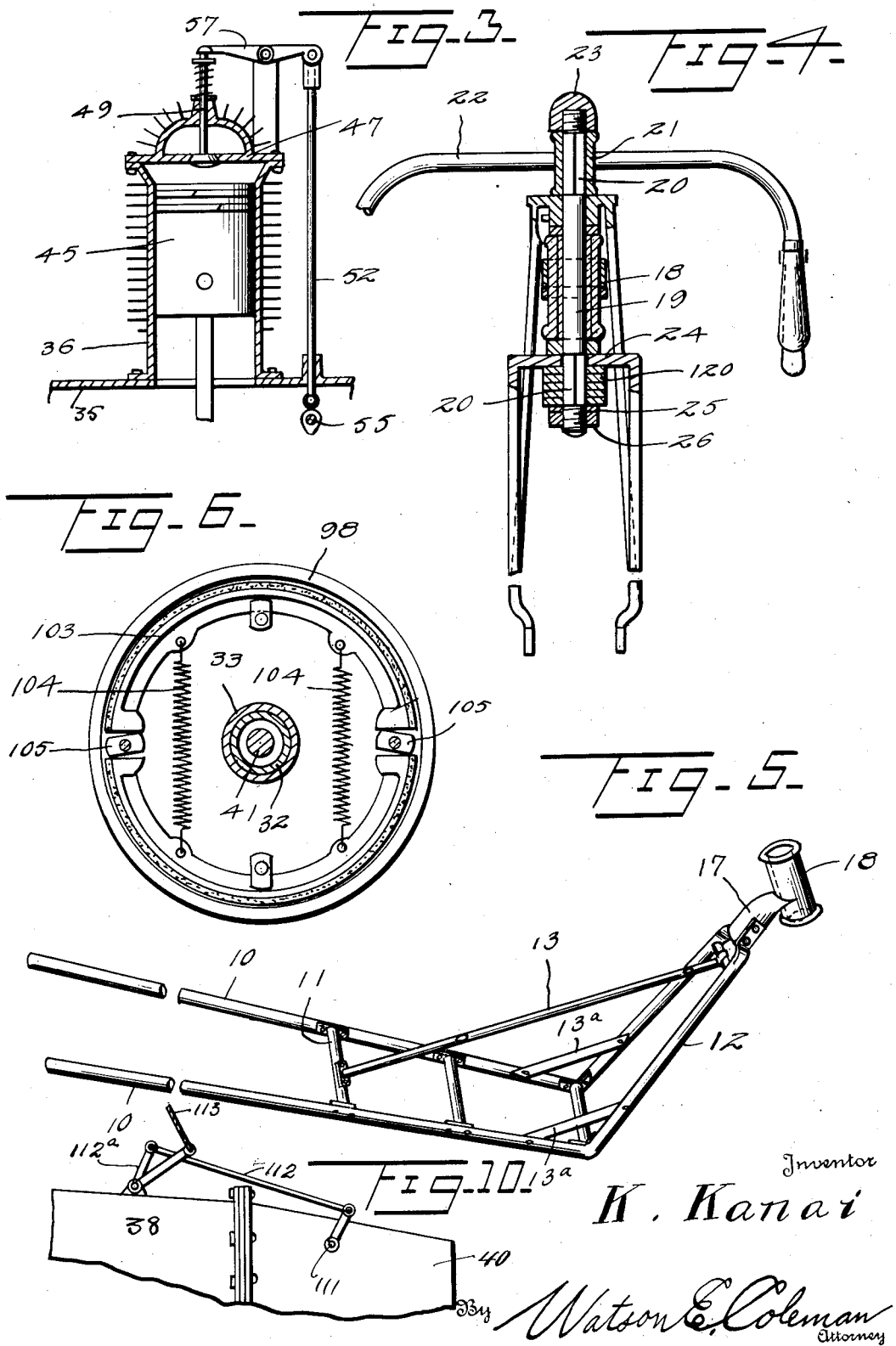

Patented Aug. 29, 1933

1,924,363

UNITED STATES PATENT OFFICE 1,924,363

FRONT WHEEL DRIVE MOTORCYCLE

Kunzo Kanai, Bosler, Wyo.

Application March 12, 1932. Serial No. 598,466

2 Claims. (Cl. 180—31)

This invention relates to motorcycles and particularly to motorcycles in which the front wheel is used as the driving wheel.

One of the objects of this invention is to provide a motorcycle with a resilient driving wheel so that the jars and jolts will not be communicated to the engine to the extent that they would be with a rigid wheel and will not be communicated to the rider.

A further object in this connection is to provide a spring suspension for the fuel tank.

A further object is to provide a motorcycle with interchangeable frames detachably engaged with the steering post of the motorcycle so that the motorcycle can be converted from a bicycle structure to a tricycle structure and thus fitted for carrying either the driver alone or the driver and passengers or a load in place of the passengers.

Another object is to provide a structure in which either one or two cylinders to a four cycle engine may be used without changing the transmission mechanism or controlling mechanism.

A further object is to provide the rear wheel of the motorcycle with a foot brake while the front wheel carries an emergency hand brake.

Another object is to provide a transmission mechanism which will secure four speeds forward and in which the transmission shaft is formed in two pieces to thus secure the free running of the engine and another object in this connection is to provide a driving shaft which is disposed inside of the transmission case and in which the driving shaft drives the wheel directly.

Other objects will appear in the course of the following description.

My invention is illustrated in the accompanying drawings, wherein:—

Figure 1 is a side elevation of a motorcycle constructed in accordance with my invention;

Figure 2 is an enlarged vertical section taken through the front wheel, the driving and transmission mechanism;

Figure 2a is a section on the line 2a—2a—of Figure 2;

Figure 3 is a sectional view through one of the cylinders of the engine taken at right angles to Figure 2;

Figure 4 is a vertical sectional view through the steering fork and allied parts;

Fig. 5 is a perspective, fragmentary view of the frame;

Figure 6 is a side elevation of the brake, the axle and sleeves being in section;

Figure 7 is a longitudinal sectional view through the transmission gears and clutch;

Figure 8 is a side elevation of one form of carbureter;

Figure 9 is an inside elevation of the brake;

Figure 10 is a fragmentary elevation of the clutch case and gear case showing the clutch operating mechanism thereon.

Referring to these drawings, it will be seen from Figure 1 that my motorcycle has a front frame connected to the front wheel, a main supporting frame and a rear wheel or wheels. The main supporting frame where the machine is to be used as a motor operated bicycle or what is ordinarily termed a motorcycle comprises a pair of longitudinally extending members 10 connected by cross braces 11. The forward ends of these members are upwardly turned as at 12 and a brace 13 extends downward from the upwardly extending portions 12 to one or the other of the braces 11. Shorter braces 13a are also used connecting the side members 12 with the side members 10 of the frame. Instead I may use a tricycle frame which has exactly the same shape in side elevation as the motorcycle frame and only differs therefrom in that the rear portions of the side members 10 are spaced a greater distance from each other so as to provide for two seats or for a body being mounted upon the rear portion of the frame. The rear wheel 14 may be of any suitable construction and may be either a spring wheel or any other suitable wheel, and has the usual axle mounted upon roller bearings, these bearings being carried upon spring supports 15 in turn operatively connected to the frame members 10. The rear axle may be suspended beneath the members 10 by means of the usual supporting spring shackled to the frame at its ends or it may be supported above the frame by means of springs having their ends shackled to the frame. It will, of course, be understood that where a motorcycle frame is being used, a single rear wheel will be used whereas when the structure is converted into a tricycle, two wheels 14 will be used mounted, of course, on the same axle.

The rear wheel is provided with a brake drum 16 having a brake coacting therewith and designed to be operated by a foot pedal 107 as will be later stated. The forward ends of members 12 are engaged by a goose-neck 17 mounted upon a sleeve 18 through which the steering post of the vehicle passes. The steering post comprises an upwardly and rearwardly extending bolt 19 having a medially disposed portion which is cylindrical in form to fit within the sleeve 18 and at each end beyond this cylindrical portion, this post is square or many-sided in cross section as at 20, the extremities of this bolt being screw-threaded. A steering head 21 fits upon the upper squared portion of the bolt 19, this steering head having the usual handles 22. This is held in place by a washer and a screw-threaded cap 23. The lower squared end of the bolt is engaged with a square opening in the upper end of the fork 24 held in place by threads 25 and a nut 26.

Disposed within the fork 24 is the combined driving and steering wheel designated generally 27. This has the usual rubber tire 28, the rim 29, the hub 30 and preferably a plurality of helically coiled resilient spokes 31 operatively connected to the hub and to the rim so that the rim of the wheel is cushioned with relation to the hub of the wheel and thus all jars to which the wheel is subjected are taken up or cushioned by these spring spokes 31.

In this vehicle, the motor or engine is mounted upon one side of the wheel, the weight of this motor engine being counter-balanced by the transmission mechanism which is mounted upon the other side of the wheel as illustrated in Figure 2.

Extending through the hub of the wheel are two concentric sleeves designated 32 and 33. The sleeve 32 extends laterally beyond the sleeve 33 and beyond the hub and is then formed to provide a fly wheel housing 34 which is bolted to the crank case designated generally 35, the cylinder 36 being mounted upon this crank case. I have only shown and illustrated one cylinder but it will be understood that two or more cylinders might be used. The sleeve 33 is extended laterally beyond the one end of the sleeve 32 and is then outwardly extended to form the inner wall 37 of the transmission housing 38, the outer wall of which is designated 39 and mounted against the outer wall 39 of this transmission housing is a clutch housing 40.

Disposed within the sleeves 32 and 33 is the transmission shaft section 41 formed at one end with a socket 42 or joint and at the other end flanged to be bolted to the hub of a fly wheel 43, this fly wheel in turn being bolted on or otherwise connected to the crank shaft 44 of the engine. This crank shaft is mounted in suitable bearings in the crank case of the engine and is provided, of course, with the usual piston 45 operating within the cylinder 36, this cylinder being closed by a head 47. Preferably the engine is a valve in the head engine, this head being provided with an inlet and outlet valve 48 and 49 and the head being provided with an exhaust port 50 and an inlet port 51 connected as will be later stated to a suitable manifold.

The crank shaft 44 is mounted in suitable bearings and projects out at one end through the crank case and is there provided with the usual starting handle 52. The crank shaft carries upon it the pinion 53 which meshes with the pinion 54 on a cam shaft 55 whereby the valves 48 and 49 are operated, this cam operating a tappet rod 56 in turn operating a tappet 57, one of the tappets controlling the inlet valve and the other the outlet valve. The cylinder is preferably provided with fins and is an air cooled engine as distinguished from a water cooled engine and, of course, is provided with the usual spark plug.

For the purpose of lubrication, I provide within the crank case the gear pump 58, the driving member of this gear pump being mounted upon a vertical shaft 59 having a worm wheel at its upper end engageable with worm threads 60 on the shaft 44. The shaft 59 is mounted in a bracket 61. Extending transversely across the crank case is a deck 61a on which oil may be discharged from the pump so as to provide for splash feed.

As before remarked, the shaft section 41 is provided at one end with a socket 42 and engaging this socket is the many-sided end of a transmission shaft section 62 provided with a shoulder or anchor 62a adjacent its many-sided end. The outer portion of the shaft section 62 fits within a tubular shaft section 63 carrying at one end the drive gear 64.

Slidingly mounted upon the shaft section 63 is a sliding gear wheel 65 also having thereon the smaller diametered gear wheel 66 and the gear shifting collar 67. This gear shifting collar is engaged by a gear shifting finger 68 carried by a rod 69. Also mounted upon the square shaft 63 in spaced relation to the gear wheels 65 and 66 and collar 67 is a collar 70 carrying upon it the gear wheel 71 and a clutch member 72, that is a gear wheel having exterior teeth. A gear shifting finger 68a engages this collar 70 and is carried by clutch shifting rods 69a.

The extremity of the shaft 62 rotatively engages the end plate 78 of a clutch drum 73 having a tubular shaft 74 attached thereto which carries the gear wheel 75. The face of this gear wheel is provided with teeth 76 which may be on the inner face of the gear wheel and which engage with the teeth on the clutch or gear wheel 72 when the member 72 is shifted into operative contact or engagement with the teeth 76. The tubular shaft 74 is supported in bearings 77, these bearings being, of course, anti-friction bearings.

The clutch drum forms part of a friction disk clutch which will be later described. The shaft 62 drives the anterior member of this clutch which through the disks of the clutch drives the drum 73 which in turn drives the gear wheel 75. The clutch is, of course, operated by the usual pedal as will be later stated.

Disposed parallel to the shaft 62 and 63 is a counter shaft 79 mounted in anti-friction bearings in the end walls of the transmission housing and carrying upon it the third speed gear 80, the second speed gear 81, the low speed gear 82, the idler 83 and the counter shaft drive gear wheel 84. Extending parallel to the counter shaft is a driven shaft 85 mounted in anti-friction bearings in the end walls of the transmission housing which carries upon it the gear wheel 86 engaging the idler gear wheel 83. Also mounted upon this shaft 85 is a gear wheel 87 which engages with a gear wheel 88 mounted upon a portion of the hub of the forward wheel of the machine.

It will be seen that the power of the engine is transmitted to the shaft 41 and through shaft 41 to the clutch back through the clutch drum 73 to gear wheel 75, thence by gear wheel 84 to the counter-shaft 79, from the counter shaft to the gear wheels 71, 66, and 65 which are of different diameters, thence to the tubular shaft 63 and by way of gear 64 and the idler gear 83 to the counter-shaft gear 86 which through the gear 87 drives the gear wheel 88 directly connected to the hub of the forward wheel of the machine. By selectively shifting the gear shifting collars by means of the rods 69 and 69a, low speed, second speed or third speed may be secured and when the gear wheel 72 is directly engaged with the gear wheel 75, a fourth or high speed is secured, cutting out the transmission through the counter shaft 79. The shifting of the rods 69 and 69a is secured by means of a shaft 89 provided at its upper end with a handle and at its lower end having an arm 90, this shaft having in its length a universal joint 89a. Each rod 69 and 69a is notched at one end and a spring actuated detent 90 yieldingly holds the rod in any of its shifted positions. The rods 69 and 69a are mounted in supporting brackets 92.

Each rod 69 or 69a has formed on it a socket 90a, these sockets facing the ball on the arm 90 and the ball, when the shaft 89 is raised, engages the socket on the rod 69a. When the shaft 89a is shifted downward from its neutral position, the ball on arm 90 will engage in the socket in the rod 69 but thus select the different speed trains to be used.

Gear wheel 88 is housed by means of annular plate 93 attached to end wall of the transmission housing and the inner end of this plate being formed with a hollow flange 94 which may be filled with any suitable packing.

Hub 30 is provided upon its inner face with the bushing 95 having a flange at one end. This flange rests upon a tubular shaft 96 which carries the gear wheel 88. The shaft 96 is provided with two annular flanges 97. A brake drum 98 of any suitable character abuts against one of these flanges 97 and has a flange 99 upon which the bushing 95 rests. Bolts 100 passing through the flanges 97, through the flanges on the end of the bushing and through the inner portion of the brake drum clamp the parts together.

Timken or other bearings 101 are disposed between the shaft 96 and the sleeve 33 to thus support the shaft and wheel for rotation. Associated with the brake drum 98 is the brake supporting plate 102 carrying any suitable or usual brake shoes 103 contracted by the springs 104 and expanded by means of the expanders 105, these expanders being operatively connected to the usual brake rod 106. This brake rod extends upward and is there connected to a brake grip 107a mounted upon a steering handle 22.

The arms of the fork 24 are connected in the well-known manner to the front axle through shocks absorbers, the wheel being hung on bellcranks 108 rearward of the toes of the fork so that the wheel will glide over irregularities in the road instead of the shock being transmitted directly up the fork. While I have illustrated this method of supporting the wheel within the fork, this is no part of my invention and inasmuch as it is well-known, I will not describe it in detail.

As before stated, the extremity of the shaft 62 is connected to the driving plate 78 of any usual or suitable clutch. I have illustrated a common form of dry disk clutch including a plurality of driving clutch disks and intermediate driven clutch disks, each of these disks being formed to receive a plurality of keys, the keys of the small clutch disks being engaged with a relatively small clutch disk drum 110 while the remainder of the clutch disks having slots to receive keys upon the clutch disk drum 73. The shaft of the plate 78 is provided with the clutch shifting collar 109 with the usual spring, etc., this clutch shifting collar being operated by means of the clutch, operating shaft 111 having an arm connected by a rod 112 to a bell crank 113 as shown in Fig. 10. This bell crank 112a is connected by means of the cable 113 which runs over a pulley 114 mounted on the sleeve 18 as shown in Fig. 1. The cable runs down into the interior of the brace 13 and is guided downward through this brace by means of pulleys 13a as shown in Figure 1 and at its lower end is connected to a lever 114a mounted on the member 13.

The lever 114 is connected by a link 115 to a clutch operating pedal 116. The clutch is, of course, thrown in by the usual spring 109a and a depression of the clutch pedal throws the clutch out. I do not wish to be limited to the particular mechanism illustrated for throwing the clutch in or out.

The saddle 117 is mounted upon the frame member 13 and is spring supported. Any suitable mechanism for this purpose may be used. The gas tank 118 is supported upon a transmission and motor suspender 119 which at its lower end is connected to the transmission housing and at its upper end is supported by a series of leaf springs 120. This support 119 as shown in Figure 1 is in the form of a yoke contracted toward its upper end as at 121 to form an eye or loop to which the free end of the uppermost leaf of the series of springs is connected. One of the arms of this yoke is connected to the transmission case by bolts while the other arm is bolted to the crank case by bolts. The spring at its rear end is operatively connected to the steering post as shown in Fig. 4. It will be understood, of course, that the ports 50 and 51 will be connected to any suitable exhaust and inlet manifolds such as the manifolds shown in Figure 8 wherein the exhaust manifold is designated 122. The inlet manifold 123 extends longitudinally through an enlargement of the exhaust manifold provided at its lower end with the usual bowl connected by pipe to a source of kerosene, for instance, and gasoline by a three-way valve 125 so that gasoline may be used for starting the engine and kerosene vaporized by the heat of the exhaust for driving the engine. It is to be understood that the spark and throttle of the carbureter are controlled by a rotatable member on the handle bar as is usual in motorcycles and that any suitable bearing means may be used in connection with the rear axle and the front axle.

Of course, it will be understood that any other suitable carbureter may be used. It will also be understood that various modifications might be made in the details of construction and arrangements of parts without departing from the spirit of the invention as defined in the appended claims. It will be seen that I have provided a motor vehicle of the motor car type which is chainless and in which the front wheel is driven directly from the engine, thus permitting the use of either one or two wheels to support the rear end of the motorcycle, thus making the device convertible from a motor-bicycle to a tricycle.

Furthermore, I have so constructed the front wheel that a resilient wheel may be used to thus take up the shocks and jars to which the machine is subjected, particularly by the front wheels striking obstructions and that I balance the engine by the transmission mechanism so that the engine may be placed on one side of the wheel and the transmission on the other. It will be seen further that all of the parts are enclosed. Thus, for instance, the oil pump 58 is disposed within the crank case and the transmission mechanism is disposed within the transmission case as is the clutch. Thus all the parts are shielded and yet access may be readily had thereto.

I claim:

1. In a vehicle, a traction wheel, a tubular, fixed axle upon which the traction wheel turns, a crank case mounted at one end of said axle, an internal combustion engine carried by the crank case, a crank shaft in the crank case driven by the engine, the shaft extending through the tubular axle, a transmission casing attached to the other end of the tubular axle and including a clutch housing, transmission mechanism including a main shaft, the main shaft and crank shaft having, one, a socket, and the other projecting into said socket, a countershaft, a driven shaft, the latter being operatively geared to the traction wheel, coacting transmission gears mounted upon the countershaft and mounted loosely upon the main shaft, and selectively shiftable to secure different speeds and transmit power to the driven shaft, and a clutch for operatively connecting the main shaft to the counter-shaft.

2. In a motorcycle, a supporting frame, a forked steering post, connected to said frame for free rotation, a wheel supporting the rear end of the frame, a front wheel mounted within the forks of the steering post, an engine operatively supported by the steering post on one side of the front wheel, a transmission mechanism operatively supported on the steering post at the other side of the front wheel, means extending through the hub of the wheel for operatively connecting the transmission mechanism to the engine, means for connecting the transmission mechanism to the front wheel, a gas tank disposed above the front wheel, and means for supporting the gas tank including vertical members connected to the housings of the engine, and transmission mechanism at their lower ends extending vertically upward and a multiple leaf spring mounted upon the steering post and at its forward end pivotally connected to said upwardly extending members, the gas tank being mounted upon said upwardly extending members.

KUNZO KANAI.